Patented July 30, 1940

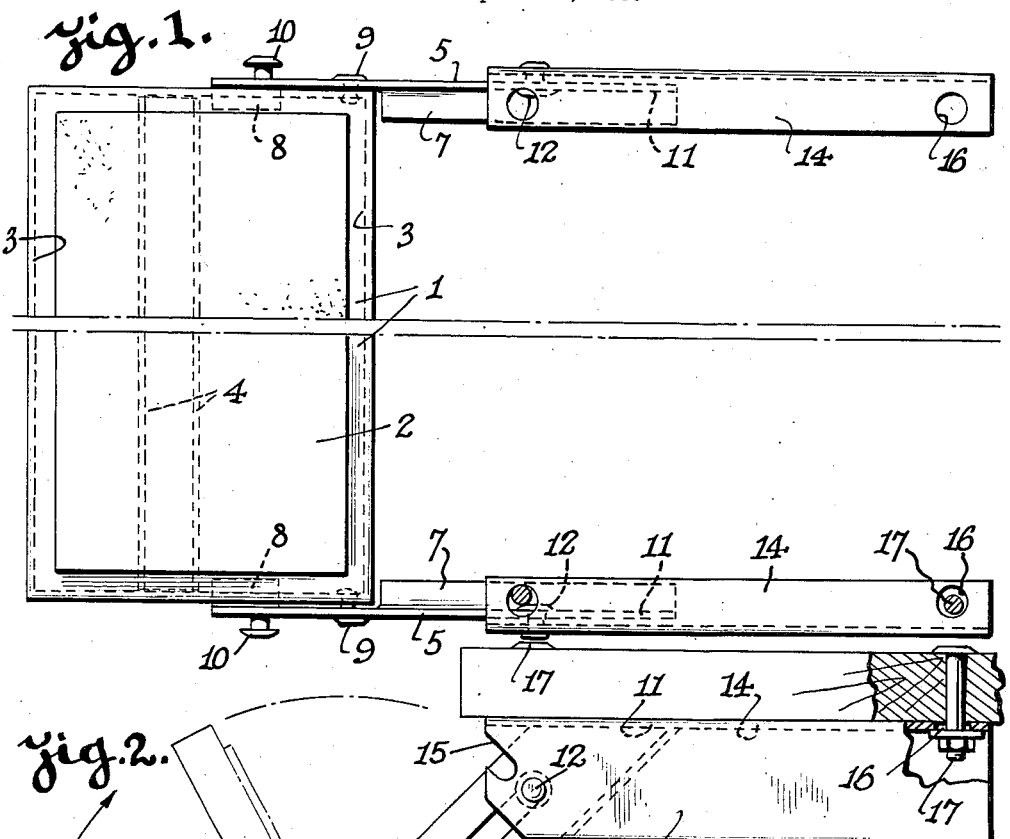
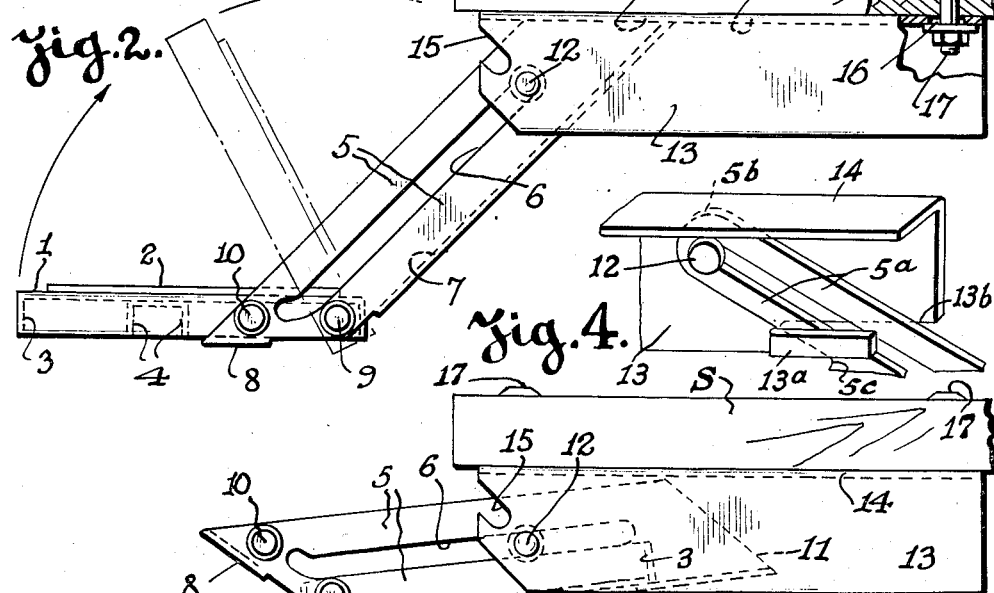
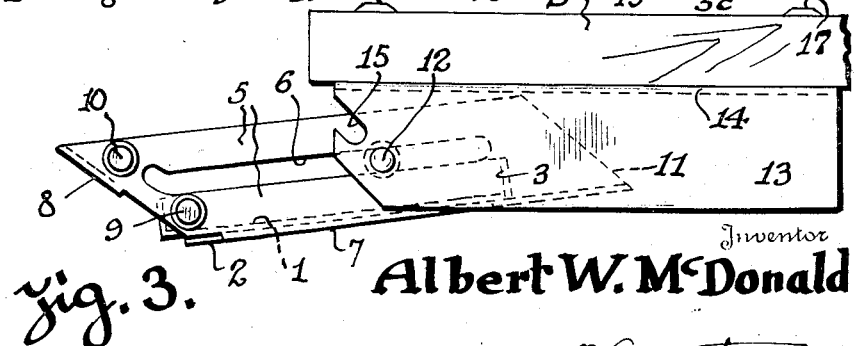

2,209,576

UNITED STATES PATENT OFFICE 2,209,576

FOLDABLE STEP FOR TRAILERS

Albert W. McDonald, Elkhart, Ind.

Application April 19, 1939, Serial No. 268,790

6 Claims. (Cl. 280—166)

The object of my invention is to provide a novel foldable step for attachment to trailers which may be quickly and easily extended for use and readily collapsed and folded under the trailer when not in use. It is also an object of my invention to provide improvements in such a foldable step which will prevent it from becoming clogged with mud and ice which would make it difficult to operate. It is also an object of my invention to provide a device of this kind which will be held in folded position by its own weight without the use of fastening springs.

It is also an especial object of my invention to provide a foldable step having a hinged portion quite close to its inner edge so that it will not tilt up when a person steps into the trailer from it.

It is also an object of my invention to provide novel means for bracing and supporting the step when in its extended position. It is also an object of my invention to provide improved means for supporting the said arms which carry the tread of the foldable step in their proper angularly extended position.

It is also an object of my invention to provide novel construction of the tread itself and to provide reenforcing means for said tread.

I attain these and other objects of my invention by the mechanism illustrated in the accompanying drawing, in which—

Figure 1 is a top plan view of my foldable step in extended position;

Fig. 2 is a side elevation of same in extended position, the dotted line showing of the tread indicating the direction of folding; a portion of the figure being shown in section to illustrate the manner of fastening the brackets to the trailer body;

Fig. 3 is a side elevation of the invention with the tread in folded position and the side arm inserted part way into its brackets;

Fig. 4 is a detail perspective view of a modified form of bracket and arm showing an alternative means of bracing the arm in its slanting tread supporting position.

Like characters of reference designate like parts in each of the several views.

Referring to Figs. 1, 2 and 3 of the drawing, I provide a metal tread 1 having downturned flanges 3 on all sides. This tread is reenforced by an inverted U-shaped channel iron 4, which extends longitudinally of the tread on its underside somewhat nearer the front than the rear, as shown in dotted lines in Figs. 1 and 2.

Pivotally attached to the downturned flanges of the tread are side arms 5, having a pivotal connection 9 near the rear portion of the tread, as shown in Fig. 2 of the drawing. The side arms 5 have a longitudinal slot in each; these slots and slots 15 and rivets 10 function as a locking element for the side arms and tread. Side arms 5 also have inwardly turned rear bottom flanges 7 which brace the arm, and an inturned flange 8 on the outer end of the arm which engages under and supports the tread, as shown in Figs. 1 and 2. Each side arm also has a projecting rivet 10 near its outer end positioned to seat in a diagonal slot 15 in the outer end of the upright bracket 13 when the side arms are in their retracted position, which preferably is positioned somewhat nearer the front than the rear of said arms, as shown in Fig. 2. When the side arms are in their extended position and their inner beveled ends 11 lie in a horizontal plane, they abut against the horizontal surface of the inturned flanges 14 of brackets 13. The inturned flanges 14 of the depending brackets 13 are provided with round apertures 16 through which the bolts 17 are inserted to secure the brackets to the body S of the trailer. The apertures 16 are oversized relative to the bolt 17, whereby to permit of adjustment of the bracket in whatever direction is desired in attaching the device to the trailer to secure proper alignment of the bracket.

In Figs. 1 and 2, the tread is shown in its extended position ready for use. It will be particularly noted that the pivots 19 between the tread and the side arms are positioned near the rear of the tread so that when the user steps on the tread, it will remain in a horizontal position and will not tilt upwardly as the user's weight moves toward the toe of his foot in stepping up. In this respect my device is an improvement over devices of the prior art having the tread pivoted nearer the central portion.

In order to fold the step for traveling, the tread is swung upwardly on the pivot 9, as indicated by the arrows in Fig. 2, until its upper portion rests against the inturned flanges 7 of the side arms 5. The side arms are then raised, as shown in Fig. 3, and the side arm and tread together are slid inwardly into the depending brackets 13 guided by the rivets 12 which project into the slots 6 of the side arms. As the side arms approach their closed position, the rivets 10 are engaged in slots 15 of the brackets 13, whereby they are held in a substantially locked position in said brackets.

It may be noted that there is an especial advantage in having the slot 6 disposed in the side arms as when the device is in its folded position, the tread and side arms are protected from mud and ice by the depending brackets 13. There is an additional advantage in this connection in that the tread will drop naturally into place by gravity when the step is opened up for use.

The beveled inner ends of the side arms 5, and the flanges 7 engage against the horizontal flanges 14 of the depending brackets 13 to brace the side arms in their diagonally extended position for use. The angle of the bevel 11 of the inner ends of arms 5 may be varied to position the step closer to or farther away from the body of the trailer, according to the needs of the customer and the type of the particular trailer.

Ordinarily the side arms are disposed at an angle of approximately 45° from the horizontal plane of flanges 14. It will also be noted that when the step is folded, the weight of the step itself tends to hold it in proper position within the depending flanges 13 without the necessity of any spring or other similar device to hold it in place.

Referring to Fig. 4, there is illustrated a modified form of arm 5a, which I have provided having its end 5b rounded. The arm when in operative position engages between offset flange 13a formed from the cut out portion 13b of depending bracket 13, whereby to support the arm 5a in its desired angularly extended position, and also function to prevent play or movement of that arm when extended and in use. Arm 5a is preferably recessed at 5c, as shown in Fig. 4.

What I claim is:

1. In a foldable step for trailers, a pair of spaced depending brackets secured to the under side of the body of the trailer, inwardly projecting rivets on said depending brackets, side arms having longitudinal slots into which said rivets project short diagonal slots in the ends of the brackets, rivets on said arms engageable in said slots, the aforesaid slots being suitably disposed to bind and lock the step in place when it is moved into its folded and retracted position, said arms being slidable relative to the brackets, a tread pivotally mounted on the outer end of said side arms, the side arms having inturned flanges at their ends engaging under the tread to hold same in a horizontal position, and means for holding the side arms in an extended downwardly slanting position.

2. In a foldable step for trailers, a pair of spaced depending brackets adjustably secured to the under side of the body of the trailer, inwardly projecting rivets on said depending brackets, side arms having longitudinal slots into which said rivets project, longitudinal inturned flanges on the side arms, said arms being slidable relative to the brackets, a tread pivotally mounted on the outer ends of said side arms, the side arms having inturned flanges at their outer ends engaging under the tread to hold same in a horizontal position, the said arms and their inturned longitudinal flanges having their inner edges beveled to horizontally abut against the inturned flange of the depending bracket to support the side arms in their slanting position when extended for use to support the tread.

3. In a foldable step for trailers, a pair of spaced depending brackets adjustably secured to the under side of the body of the trailer, inwardly projecting rivets on said depending brackets, side arms having longitudinal slots into which said rivets project, said arms being slidable relative to the brackets, and a tread pivotally mounted on the outer ends of said side arms, the side arms having inturned flanges at their ends engaging under the tread to hold same in a horizontal position, the brackets each having an inwardly offset flange at their outer ends to support the side arms in their slanting position when extended for use, substantially as shown.

4. In a foldable step for trailers, the combination of depending brackets, each having a horizontal flange, bolt holes in said flanges, bolts extending through said bolt holes and securing the aforesaid brackets to the underside of the body of a trailer, the bolt holes being substantially larger than the bolts to permit of adjustment of the brackets in any direction, arms slidably mounted on the depending brackets, a tread pivotally mounted on the said arms, a pivot point being positioned close to the rear portion of the tread to prevent tilting of the tread in use, means for supporting the step in horizontal position, said depending brackets having short downwardly slanting slots in their outer ends, and projections on the forward ends of the side arms to engage in said slots to lock the step and arms in retracted position under the trailer.

5. In a foldable step for trailers, a pair of spaced depending brackets secured to the under side of the body of the trailer, rivets on said depending brackets, side arms having longitudinal slots into which said rivets project, longitudinal inturned flanges on the side arms, said arms being slidable relative to the brackets, a tread pivotally mounted on the outer end of said side arms, the side arms having inturned flanges at their outer ends engaging under the tread to hold same in a horizontal position, the said arms and their inturned longitudinal flanges having their inner edges beveled to horizontally abut against the inturned flange of the depending bracket to support the side arms in their slanting position when extended for use to support the tread.

6. In a foldable step for trailers, a pair of spaced depending brackets secured to the under side of the body of the trailer, rivets on said depending brackets, side arms having longitudinal slots into which said rivets project, said arms being slidable relative to the brackets, and a tread pivotally mounted on the outer ends of said side arms, the side arms having inturned flanges at their ends engaging under the tread to hold same in a horizontal position, the brackets each having an inwardly offset flange at their outer ends to support the side arms in their slanting position when extended for use, substantially as shown.

ALBERT W. McDONALD.